United States Patent
Koo et al.

(10) Patent No.: US 9,148,774 B2
(45) Date of Patent: Sep. 29, 2015

(54) METHOD AND APPARATUS FOR COMMUNICATION USING HETEROGENEOUS PROTOCOLS

(75) Inventors: Bon-hyun Koo, Suwon-si (KR); Kasyanov Daniil, Suwon-si (KR); Yong-suk Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 231 days.

(21) Appl. No.: 13/278,423

(22) Filed: Oct. 21, 2011

(65) Prior Publication Data

US 2012/0166580 A1 Jun. 28, 2012

(30) Foreign Application Priority Data

Dec. 28, 2010 (KR) .................. 10-2010-0137231

(51) Int. Cl.
| | |
|---|---|
| *G06F 15/16* | (2006.01) |
| *H04W 8/00* | (2009.01) |
| *H04W 4/00* | (2009.01) |
| *H04W 80/08* | (2009.01) |
| *H04L 29/06* | (2006.01) |
| *H04L 29/08* | (2006.01) |

(52) U.S. Cl.
CPC .............. *H04W 8/005* (2013.01); *H04L 69/18* (2013.01); *H04L 69/22* (2013.01); *H04L 69/32* (2013.01); *H04W 4/005* (2013.01); *H04W 80/085* (2013.01)

(58) Field of Classification Search
CPC ....... H04L 47/10; H04L 5/0048; H04L 69/32; H04L 1/1809; H04L 5/0053; H04L 69/16; H04L 69/18

USPC .......................................... 709/217
See application file for complete search history.

(56) References Cited

U.S. PATENT DOCUMENTS

| | | | | |
|---|---|---|---|---|
| 5,325,357 | A * | 6/1994 | Kimoto et al. ............. | 370/390 |
| 6,721,353 | B1 * | 4/2004 | Taubert et al. ............. | 375/220 |
| 7,139,267 | B2 * | 11/2006 | Lu et al. ..................... | 370/386 |
| 8,341,686 | B2 * | 12/2012 | Hale et al. .................. | 725/133 |
| 2004/0205251 | A1 * | 10/2004 | Wiles et al. ................ | 709/250 |
| 2006/0104302 | A1 * | 5/2006 | Cho et al. ................... | 370/445 |
| 2011/0116631 | A1 * | 5/2011 | Shon et al. ................. | 380/270 |
| 2011/0149803 | A1 * | 6/2011 | McCormack et al. ..... | 370/254 |
| 2011/0165865 | A1 * | 7/2011 | Gao et al. ................ | 455/414.1 |
| 2012/0082062 | A1 * | 4/2012 | Mccormack ............... | 370/254 |
| 2012/0236778 | A1 * | 9/2012 | Erdmann et al. .......... | 370/312 |

OTHER PUBLICATIONS

Zigbee RF4CE Specification Version 1.00, Zigbee Alliance, ZigBee Document 094945r00ZB; Mar. 17, 2009; 101 pgs.
Zigbee Specification, Zigbee Alliance, ZigBee Document 053474r17, Jan. 17,2008, 604 pgs.
Zigbee Smart Energy Profile Specification, Zigbee Alliance, ZigBee Document 075356r15, Dec. 1, 2008, 244 pgs.

* cited by examiner

*Primary Examiner* — Kevin Bates
*Assistant Examiner* — SM Rahman
(74) *Attorney, Agent, or Firm* — Sughrue Mion, PLLC

(57) ABSTRACT

Heterogeneous protocol stacks are used in an approach including analyzing a destination network ID of data received by a shared, lower layer protocol stack, a data type field value, and/or whether any of the upper layer protocol stacks support broadcasting. An upper layer protocol stack is selected based on the results of the analysis. The received data is transmitted to the selected upper layer protocol stack. Accordingly, heterogeneous protocol stacks may be realized in one chip.

15 Claims, 9 Drawing Sheets

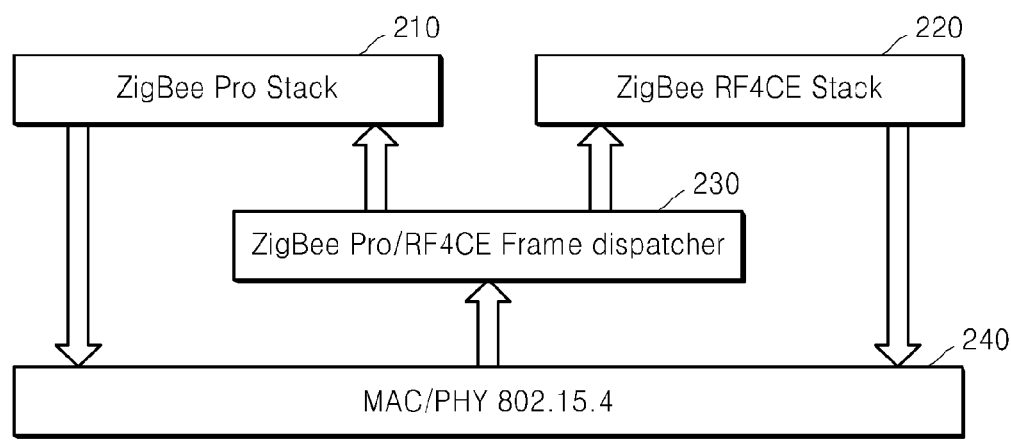

FIG. 6

| ZigBee RF4CE NWK frame format | Octets: 2 | 4 | 0/1 | 0/2 | Variable | 0/4 |
|---|---|---|---|---|---|---|
| | Frame Control | Frame Counter | Profile Identifier | Vender Identifier | Frame Payload | Message Integrity Code |
| | NHR | | | | NWK Payload | NFR |

| Frame control field of ZigBee RF4CE NWK header | Bits: 0-1 | 2 | 3-4 | 5 | 6-7 |
|---|---|---|---|---|---|
| | Frame Type | Security Enabled | Protocol Version | Reserved (=1) | Channel Designator |

| Frame Type Sub-field of frame control field of ZigBee RF4CE NWK header | Frame Type Value b₁ b₀ | Description |
|---|---|---|
| | 00 | Reserved |
| | 01 | Standard data frame |
| | 10 | NWK command frame |
| | 11 | Vendor specific data frame |

ZigBee Pro

METHOD AND APPARATUS FOR COMMUNICATION USING HETEROGENEOUS PROTOCOLS

CROSS-REFERENCE TO RELATED PATENT APPLICATION

This application claims priority from Korean Patent Application No. 10-2010-0137231, filed on Dec. 28, 2010, in the Korean Intellectual Property Office, the disclosure of which is incorporated herein by reference in its entirety.

BACKGROUND

1. Field

The inventive concept relates to methods and apparatuses for communicating using heterogeneous protocol stacks, and more particularly, to methods and apparatuses for communicating using protocol stacks of heterogeneous communication methods sharing a lower layer protocol stack.

2. Description of the Related Art

As various communicating methods have recently been developed, there is a need for a way to efficiently support various communications methods in a single device.

SUMMARY

One or more exemplary embodiments involve methods and apparatuses for communicating using heterogeneous protocol stacks in which heterogeneous protocol stacks may be efficiently implemented in a single chip.

According to an exemplary embodiment, a communication device supports a plurality of communication methods. The device receives data via a lower layer protocol stack shared by a plurality of upper layer protocol stacks. The device analyzes a destination network identifier (ID) of the received data, a field value denoting a data type of the data, and/or whether the plurality of upper layer protocol stacks support a broadcasting function or not. The device transmits data to one of the plurality of upper layer protocol stacks according to that analysis result.

When the destination network ID corresponds to a network ID of one of the plurality of upper layer protocol stacks, the device transmits the data to a corresponding upper layer protocol stack.

When the destination network ID denotes broadcasting, and at the same time the field value denoting the type of the data corresponds to broadcasting data of only one of the plurality of upper layer protocol stacks, the device transmits the data to the corresponding upper layer protocol stack.

When the destination network ID denotes broadcasting, and the field value denoting the type of the data corresponds to broadcasting data of a first communication method, and also an upper layer protocol stack of the first communication method supports a broadcasting function of the first communication method, the device transmits the data to the upper layer protocol stack of the first communication method.

When the destination network ID denotes broadcasting, and the field value denoting the type of the data corresponds to broadcasting data of a first communication method, and also an upper layer protocol stack of the first communication method does not support a broadcasting function of the first communication method, then the device transmits the data to an upper layer protocol stack of the second communication method.

When the destination network ID denotes broadcasting, and an upper layer protocol stack of a first communication method does not support a broadcasting function of the first communication method, the device transmits the data to an upper layer protocol stack of a second communication method.

The ZigBee Pro standard may be used as a first communication method, and the Zigbee RF4CE standards may be used as the second communication method.

The broadcasting function may include an Inter-PAN transmission function of a ZigBee Smart Energy (SE) profile.

The field denoting the type of the data may include a frame type field in the network header.

According to another exemplary embodiment, a communication device supports a plurality of communication methods, and the device includes a receiver receiving data via a lower layer protocol stack shared by a plurality of upper layer protocol stacks. The device also has an analyzer analyzing at least one of a destination network ID of the received data, a field value denoting a data type of the data, and whether the plurality of upper layer protocol stacks support a broadcasting function or not. The device additionally has a transmitter transmitting data to one of the plurality of upper layer protocol stacks according to the analyzer's analysis.

According to another exemplary embodiment, there is provided a computer-readable recording medium that bears a computer program for executing the methods mentioned above.

BRIEF DESCRIPTION OF THE DRAWINGS

The above and other features and advantages of the exemplary embodiments will become more apparent with reference to the discussion below and as well to the attached drawings in which:

FIG. 2 illustrates a protocol stack of a communication device using heterogeneous protocols according to an exemplary embodiment;

FIG. 3 illustrates an IEEE 802.15.4 MAC frame format;

FIG. 6 illustrates a ZigBee RF4CE network frame format;

DETAILED DESCRIPTION

Figure 1:
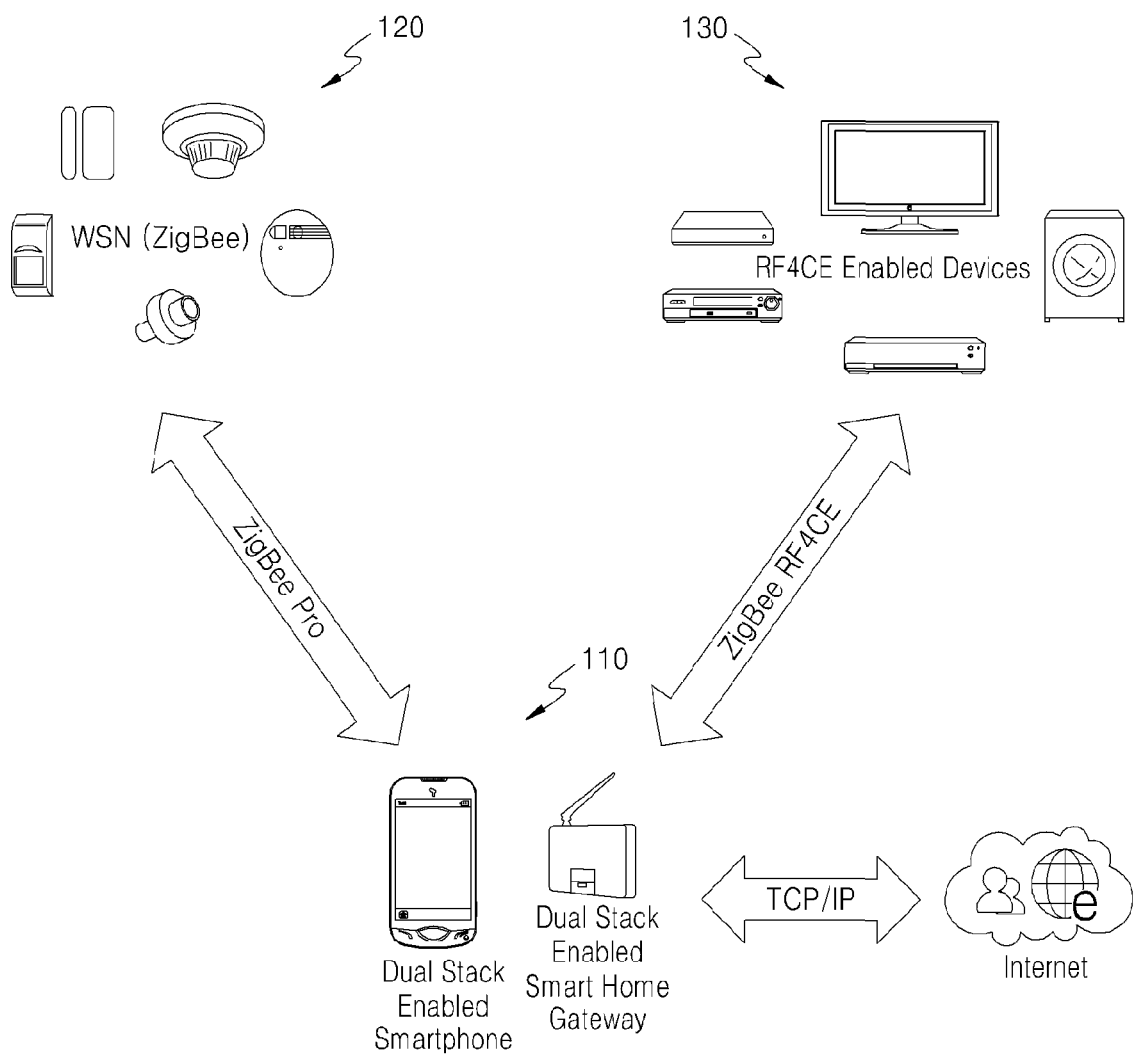
FIG. 1 illustrates a use case of a communication device using heterogeneous protocols according to an exemplary embodiment.

Since the inventive concept allows for various changes and numerous embodiments, particular exemplary embodiments will be illustrated in the drawings and described in detail in the written description. In the description below, certain detailed explanations of related art are omitted when it is deemed that they may unnecessarily obscure the inventive concept. In the drawings, like reference numerals denote like elements, and if required, an element shown on another drawing may be referred to. For convenience of description, an apparatus and a method may be described together if required.

FIG. 1 illustrates a use case of a communication device 110 using heterogeneous protocols according to an exemplary embodiment. Referring to FIG. 1, by supporting ZigBee Pro and ZigBee RF4CE protocols, the communication device 110 can, with a single device, control ZigBee Pro devices 120 such as lights, heating, ventilation, and air conditioning (HVAC), a network of wireless sensors (WSN), and a ZigBee RF4CE device 130 such as TV or audio-players. Some ZigBee Pro devices 120 may be controllable by messages according to the ZigBee RF4CE standards. Hereinafter, this description will focus on the ZigBee Pro and the ZigBee RF4CE standards, but this is merely for convenience. The concept of this exemplary embodiment may be applied to various other communicating methods within a range not departing from the inventive concept.

There are multiple approaches to supporting different communicating methods in one device. In one approach, communication chips for both of the two types of communication methods (such as ZigBee Pro and ZigBee RF4CE) may be included at the same time. This, however, increases the price of the device and raises power consumption. In a second approach, one communication method may be realized within another. For example, a ZigBee RF4CE remote control application profile may be realized in a ZigBee Pro protocol stack. However, this method increases the complexity, price, and power consumption of a remote controller and requires a new standardization. Thus, the inventive concept includes supporting two communication methods in one chip, while still allowing the existing communication standards to be used.

FIG. 2 illustrates a protocol stack of a communication device 110 using heterogeneous protocols according to an exemplary embodiment. Referring to FIG. 2, ZigBee Pro and ZigBee RF4CE standards use the same IEEE 802.15.4 protocol in the lower layers, which in this example are the data link and physical layers, and thus, a single IEEE 802.15.4 protocol stack 240 is shared in the lower layers at and below the data link layer. In the upper layers (including and above the network layer), a ZigBee Pro upper layer protocol stack 210 and a ZigBee RF4CE upper layer protocol stack 220 are separately included, and a ZigBee Pro/ZigBee RF4CE frame dispatcher 230 is included between the lower layer and the upper layer.

Data generated by the upper layer protocol stacks (namely, the ZigBee Pro upper layer protocol stack 210 and the ZigBee RF4CE upper layer protocol stack 220) and destined for transmission outside the device, is sent via the lower layer protocol stack, the IEEE 802.15.4 protocol stack 240. The data is transmitted directly to the IEEE 802.15.4 protocol stack 240 from the upper layer stacks. Conversely, data that is received from the outside by the lower layer protocol stack 240 is passed to the ZigBee Pro/ZigBee RF4CE frame dispatcher 230, and then the data is transmitted to a corresponding upper layer protocol stack (i.e., either the ZigBee Pro upper layer protocol stack 210 or the ZigBee RF4CE upper layer protocol stack 220) by the ZigBee Pro/ZigBee RF4CE frame dispatcher 230. Here, there is no need to modify anything about the existing upper layer and lower layer protocol stacks, namely, the ZigBee Pro/ZigBee RF4CE upper layer protocol stacks 210 and 220 and the IEEE 802.15.4 protocol stack 240. In determining to which of upper layer protocols the ZigBee Pro/ZigBee RF4CE frame dispatcher 230 is to transmit data, various properties of conventional protocol stacks may be used.

FIG. 3 illustrates an IEEE 802.15.4 MAC frame format. Since all personal area network (PAN) identifiers are unique within one ZigBee channel, the ZigBee Pro upper layer protocol stack 210 and the ZigBee RF4CE upper layer protocol stack 220 each obtain a respective unique PAN identifier. Accordingly, the frame dispatcher 230 may use the value of the destination PAN identifier (ID) field of a MAC header of the received data to transmit the data to the corresponding upper layer protocol stack. When the destination PAN ID indicates broadcasting, however, the destination PAN identifier (ID) will have a value of 0xFFFF. In this situation, the a network frame header may be used to determine what to do with the received frame.

Figure 4:
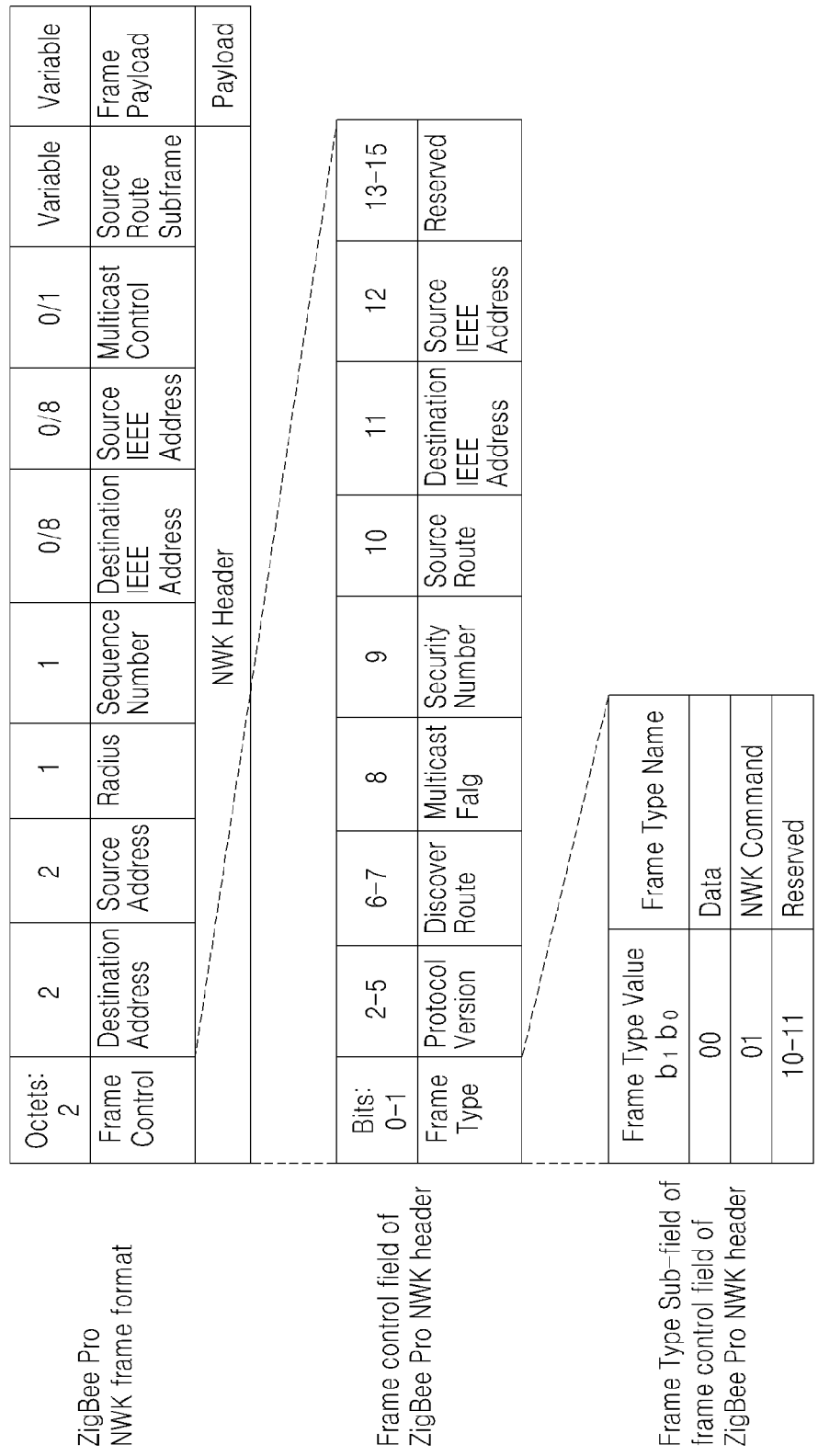
FIG. 4 shows a ZigBee Pro Network frame format.

FIG. 4 illustrates the ZigBee Pro Network frame format. Referring to FIG. 4, a ZigBee Pro network frame header has a frame control field, and the frame control field has a frame-type sub-field. If the frame-type sub-field has the value of 0b00, this denotes data. If the frame-type sub-field has the value of 0b01, this denotes a network command. The values 0b10 and 0b11 are reserved. Usually, a ZigBee Pro device does not support broadcasting between networks, although the ZigBee SE (Smart Energy) profile does. Such broadcasting between networks may be referred to as Inter-PAN transmission.

Figure 5:
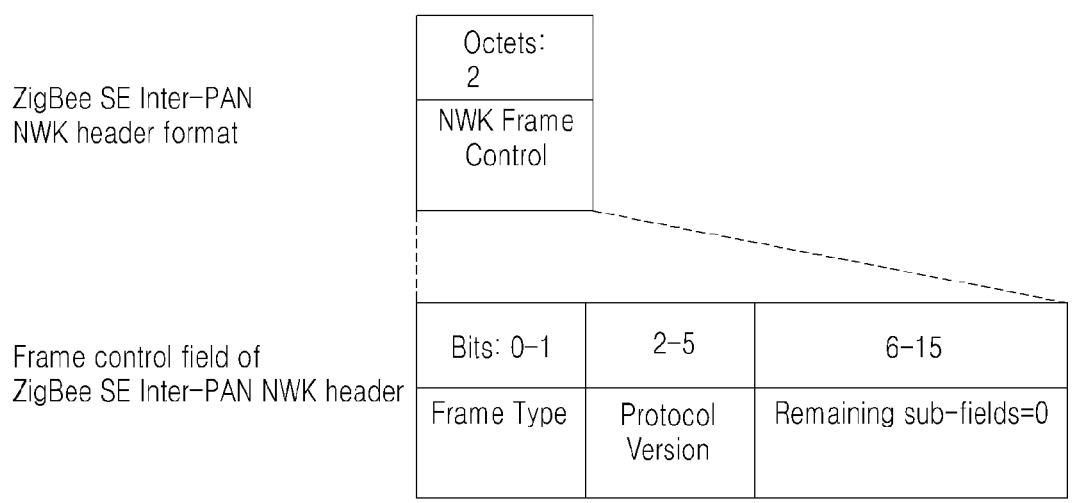
FIG. 5 illustrates a ZigBee SE Inter-PAN network header.

FIG. 5 illustrates a ZigBee SE Inter-PAN network header. Referring to FIG. 5, the ZigBee SE Inter-PAN network header has a frame-type sub-field like a general ZigBee Pro network header, but the frame-type sub-field has the value of 0b11, which was reserved in ZigBee Pro network header.

According to the ZigBee standards, a ZigBee Pro device which does not support an Inter-PAN transmission function does not support frames having a frame-type sub-field of 0b11 (which is expected to be a reserved value); a ZigBee Pro device which does support an Inter-PAN transmission function does support frames that have the value of 0b11 in the frame-type sub-field.

FIG. 6 illustrates a ZigBee RF4CE network frame format. Referring to FIG. 6, a ZigBee RF4CE network frame header has a frame control field, and the frame control field has a frame-type sub-field. Here, when the frame-type sub-field is 0b01, it denotes standard data; 0b10 denotes a network command; 0b11 denotes vendor specific data; and 0b00 is reserved.

Referring to FIGS. 4 through 6, all network frames of the ZigBee Pro and ZigBee RF4CE standards use the first two bits as frame-type sub-fields. Accordingly, if a destination PAN ID denotes broadcasting, the ZigBee Pro/ZigBee RF4CE frame dispatcher 230 may use the value of the frame-type sub-field to choose the upper layer protocol stack to which data will be transmitted. That is, when the value is 0b11, the frame dispatcher 230 can transmit the frame to the ZigBee Pro upper layer protocol, provided that the ZigBee Pro upper layer protocol stack supports the inter-PAN function (e.g., as is the case with the ZigBee Pro SE). If the ZigBee Pro protocol stack does not support the inter-PAN function, then the frame dispatcher 230 can instead transmit the data to the ZigBee RF4CE upper layer protocol stack 220. When the value of the frame-type sub-field field is 0b00, the data can be rejected. When a value of a frame-type sub-field field is 0b01 or 0b10, the ZigBee Pro/ZigBee RF4CE frame dispatcher 230 can transmit the data to the ZigBee RF4CE upper layer protocol stack 220.

Figure 7:
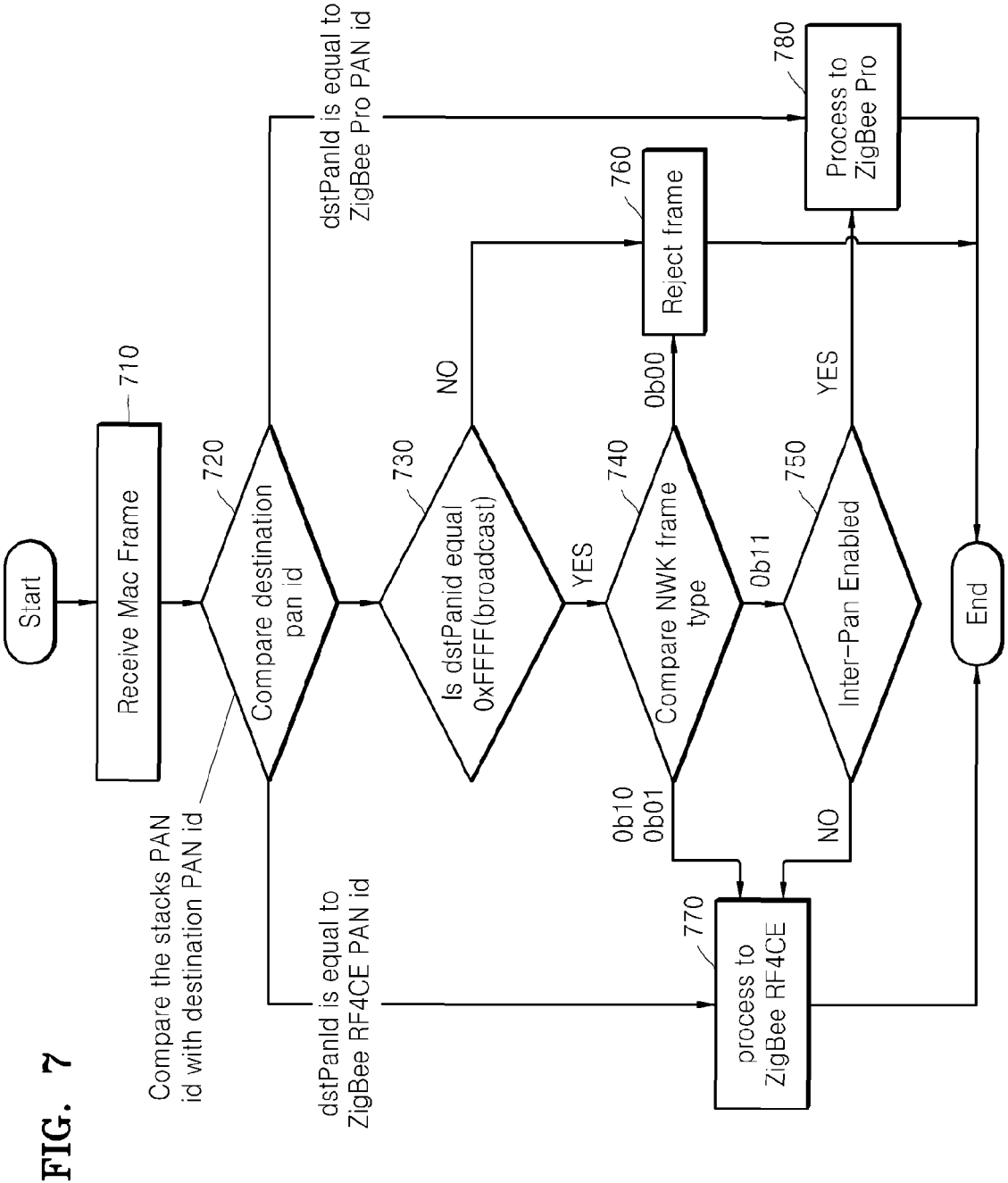
FIG. 7 illustrates a flowchart of a method of selecting an upper layer protocol stack by a frame dispatcher, according to an exemplary embodiment.

FIG. 7 illustrate a flowchart of a method of selecting an upper layer protocol stack by the ZigBee Pro/ZigBee RF4CE frame dispatcher 230, according to an exemplary embodiment. Referring to FIG. 7, the ZigBee Pro/ZigBee RF4CE frame dispatcher 230 receives data from the outside via a lower layer protocol stack, the IEEE 802.15.4 protocol stack 240, in operation 710. A destination PAN ID of data is detected in operations 720 and 730. When the destination PAN ID of data is consistent with a PAN ID of the ZigBee Pro upper layer protocol stack 210 or a PAN ID of the ZigBee RF4CE upper layer protocol stack 220, data is transmitted to a corresponding upper layer protocol stack in operations 770 and 780. On the other hand, when the destination PAN ID is 0xFFFF, this denotes broadcasting. In this instance, the method proceeds to operation 740. If the destination PAN ID is some other value such as 0b00, data may be rejected in operation 760.

If the destination PAN ID denotes broadcasting (i.e., has a value of 0xFFFF in this exemplary embodiment), the ZigBee Pro/ZigBee RF4CE frame dispatcher 230 determines the data frame type in operation 740. When the frame data type is 0b00, data is rejected in operation 760; when the frame data type is 0b01 or 0b10, the data may be transmitted to the ZigBee RF4CE upper layer protocol stack 220 in operation 770; when the frame type is 0b11, processing proceeds to operation 750 in which it is determined whether the Inter-PAN function is supported or not.

If the destination PAN ID denotes broadcasting and the frame data type is 0b11, the ZigBee Pro/ZigBee RF4CE frame dispatcher 230 determines whether the ZigBee Pro upper layer protocol stack 210 of the communication device 110 supports an Inter-PAN function in operation 750. If an Inter-PAN function is supported, data may be transmitted to the ZigBee Pro upper layer protocol stack 210 in operation 780. If not, data may instead be transmitted to the ZigBee RF4CE upper layer protocol stack 220 in operation 770.

In other words, if the destination PAN ID corresponds to one of PAN IDs of the upper layer protocol stacks (i.e., the ZigBee Pro upper layer protocol stack 210 or the ZigBee RF4CE upper layer protocol stack 220), then that corresponding upper layer protocol stack is selected. If the destination PAN ID denotes broadcasting, and a frame type value denotes broadcasting data of only one of the heterogeneous protocols, then the corresponding upper layer protocol stack is selected. For example, if the destination PAN ID is 0xFFFF, and a frame type value is 0b01 or 0b10 (this denotes broadcasting data under the ZigBee RF4CE standards), the ZigBee RF4CE upper layer protocol stack 220 is selected.

When the destination PAN ID denotes broadcasting, and a frame type value denotes broadcasting data of a predetermined protocol among the heterogeneous protocols, if the corresponding protocol stack supports broadcasting, then that corresponding protocol stack is selected, but if the corresponding protocol stack does not support broadcasting, then another protocol stack is selected. For example, when the destination PAN ID is 0xFFF, and the frame type value is 0b11 (denoting Inter-PAN transmission data of the ZigBee Pro standards), if the ZigBee Pro upper layer protocol stack 210 supports an Inter-PAN function, the ZigBee Pro upper layer protocol stack 210 is selected, but if the ZigBee Pro upper layer protocol stack 210 does not support an Inter-PAN function, then the ZigBee RF4CE upper layer protocol stack 220 is selected.

According to an exemplary embodiment, if the destination PAN ID denotes broadcasting, and the ZigBee Pro upper layer protocol stack 210 does not support an Inter-PAN function, the frame dispatcher 230 may transmit data to the ZigBee RF4CE upper layer protocol stack 220 without determining the frame type (i.e., without considering the frame type value).

According to an exemplary embodiment, if the destination PAN ID denotes broadcasting and the frame type is 0b11, the ZigBee Pro/ZigBee RF4CE frame dispatcher 230 may transmit data to the ZigBee Pro upper layer protocol stack 210 without determining whether a ZigBee Pro protocol stack supports an Inter-PAN function or not.

According to an exemplary embodiment, if data may correspond to either the ZigBee Pro upper layer protocol stack 210 or the ZigBee RF4CE upper layer protocol stack 220, the ZigBee Pro/ZigBee RF4CE frame dispatcher 230 may transmit data to both the ZigBee Pro upper layer protocol stack 210 and the ZigBee RF4CE upper layer protocol stack 220.

According to an exemplary embodiment, when the destination PAN ID denotes broadcasting, and a frame type is 0b11, if a ZigBee Pro protocol stack supports an Inter-PAN function, the ZigBee Pro/ZigBee RF4CE frame dispatcher 230 may transmit data to both the ZigBee Pro upper layer protocol stack 210 and the ZigBee RF4CE upper layer protocol stack 220.

According to an exemplary embodiment, if the destination PAN ID denotes broadcasting, and a frame type is 0b11, the ZigBee Pro/ZigBee RF4CE frame dispatcher 230 may transmit data to both the ZigBee Pro upper layer protocol stack 210 and the ZigBee RF4CE upper layer protocol stack 220 without determining whether a ZigBee Pro protocol stack supports an Inter-PAN function or not.

The uniqueness of PAN ID's is achieved by an Active scan mechanism. An Active scan mechanism is a part of a node cold start of the ZigBee RF4CE standards and a part of the network formation process in the ZigBee Pro standards. That is, the network start processes of the ZigBee RF4CE and ZigBee Pro standards are the same and thus uniqueness of a PAN ID is guaranteed.

Figure 8:
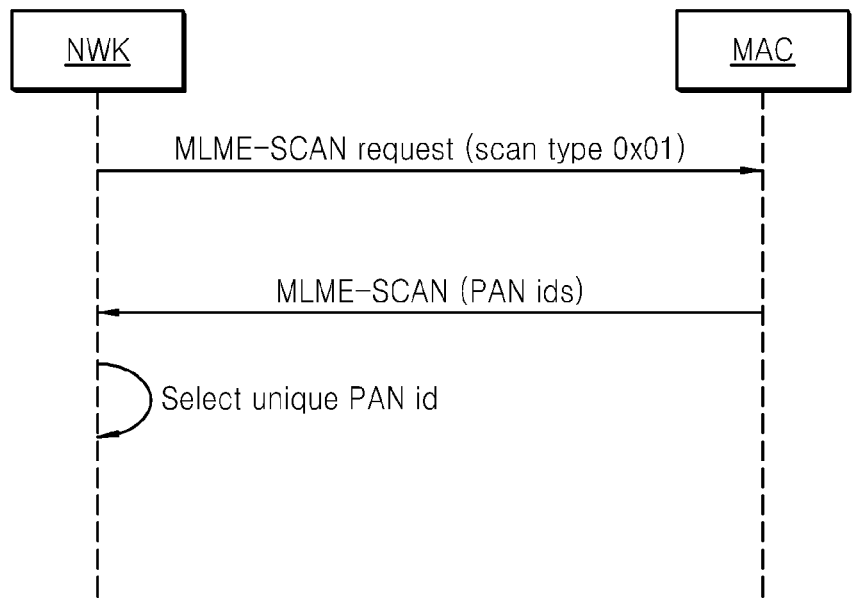
FIG. 8 illustrates a sequence diagram of a flow of an active scanning procedure.

FIG. 8 illustrates a sequence diagram of a flow of an active scan procedure. Referring to FIG. 8, the network layer of the upper layer protocol stacks (i.e., the ZigBee Pro upper layer protocol stack 210 and the ZigBee RF4CE upper layer protocol stack 220 in this example) of the communication device 110 transmits a MLME-SCAN.request (scan type 0x01) to the data link layer 240, and receives an MLME-SCAN.confirm including PAN IDs of all network currently operating in the same channel, and thus, can select a unique network PAN ID regarding its own network. This technique is known and a detailed description thereof would mire the description in unnecessary details and, thus, will not be provided here. The communication device 110 according to the current exemplary embodiment has a plurality of upper layer protocol stacks, the ZigBee Pro upper layer protocol stack 210 and the ZigBee RF4CE upper layer protocol stack 220, and thus, if one upper layer protocol stack has already formed a network, a corresponding PAN ID may be considered by other upper layer protocol stacks.

Figure 9:
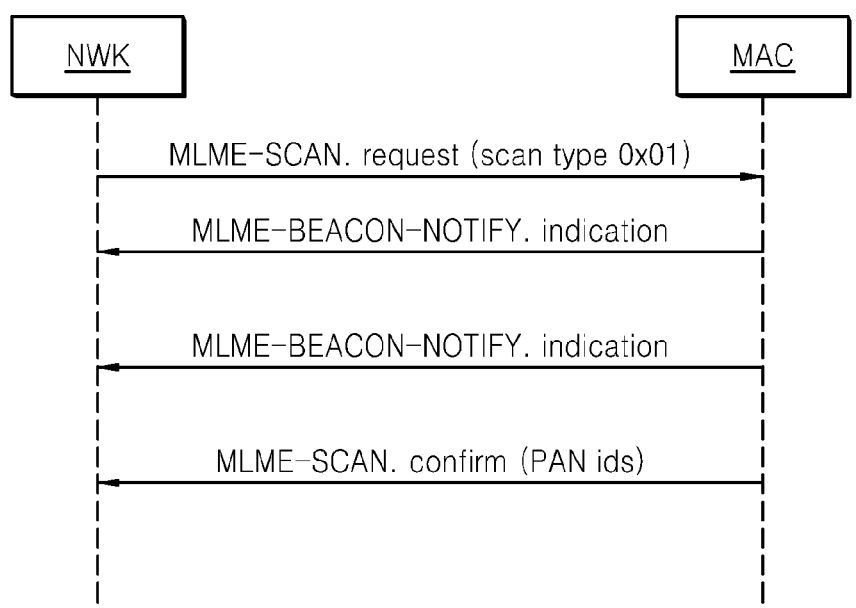
FIG. 9 illustrates a sequence diagram of a flow of a network discovery procedure of ZigBee Pro standards.
Figure 10:
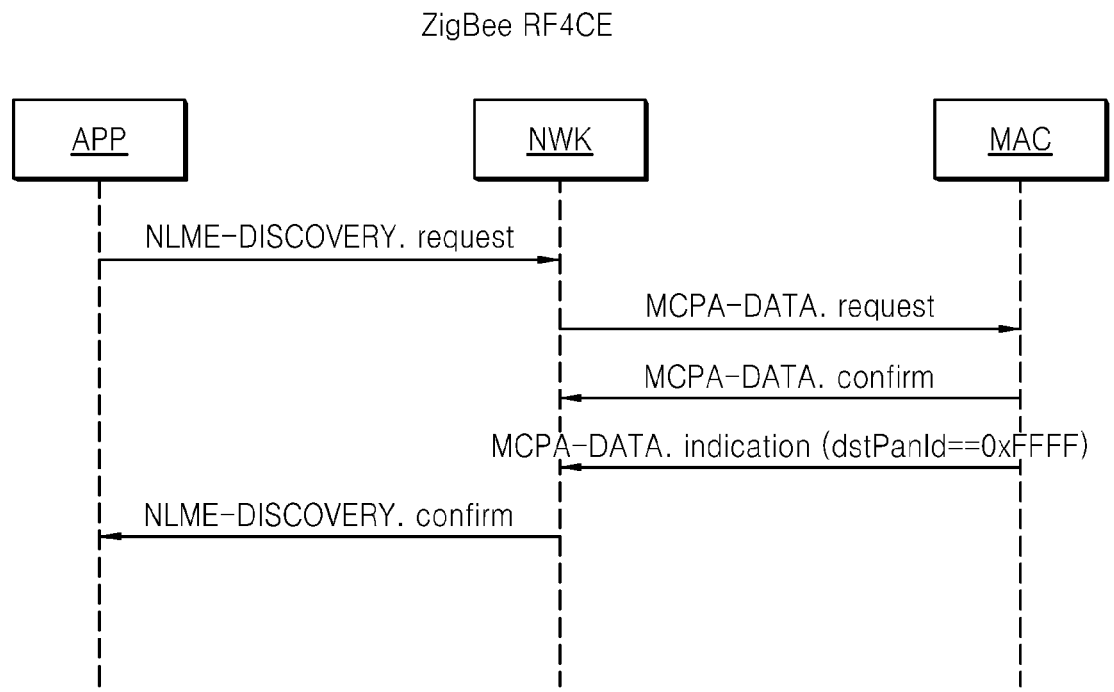
FIG. 10 illustrates a sequence diagram of a flow of a network discovery procedure of ZigBee RF4CE standards.

The communication method using heterogeneous protocols according to the current exemplary embodiment may also be applied even when a network joining procedure, that is, a PAN ID, is not known. FIGS. 9 and 10 are sequence diagrams illustrating a network discovery procedure of ZigBee standards. Referring to FIG. 9, a ZigBee Pro stack uses a MAC beacon payload in a network discovery procedure. A MAC beacon payload is configured to be distinguished from other IEEE 802.15.4 PAN. That is, according to the ZigBee standards, the first byte of a beacon payload in the ZigBee Pro standards is 0x00, and a first byte of a beacon payload in the ZigBee RF4CE standards is 0xCE. Referring to FIG. 10, a ZigBee RF4CE stack broadcasts a network discovery request command, and receives a network discovery response command with a destination PAN ID set as 0xFFFF. This frame may then be processed using the above-described method of selecting an upper layer protocol stack.

Figure 11:
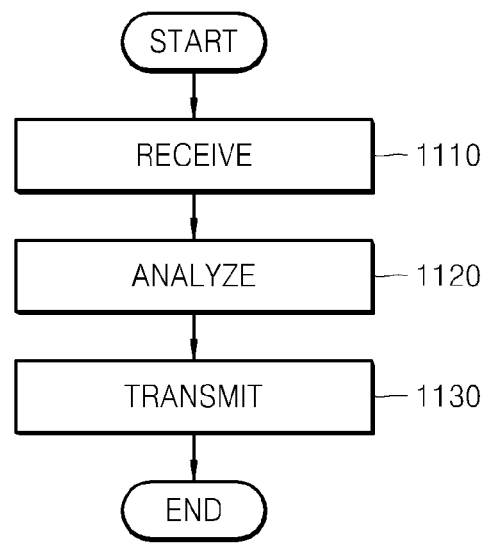
FIG. 11 illustrates a flowchart for a method of communicating according to an exemplary embodiment.

FIG. 11 illustrates a flowchart of a method of communicating intended for use in a communication device 110 that supports a plurality of communications methods, according to an exemplary embodiment. Referring to FIG. 11, the method includes operation 1110 of receiving data via a lower layer protocol stack shared by a plurality of upper layer protocol stacks. The method further includes operation 1120 in which the destination network ID of the received data and/or the field value denoting a data type is analyzed. Another point analyzed is whether the different upper layer protocol stacks support broadcasting or not. The result of this analysis is used to determine in operation 1130 in which the transmitting of the data to one of the plurality of upper layer protocol stacks is carried out.

Figure 12:
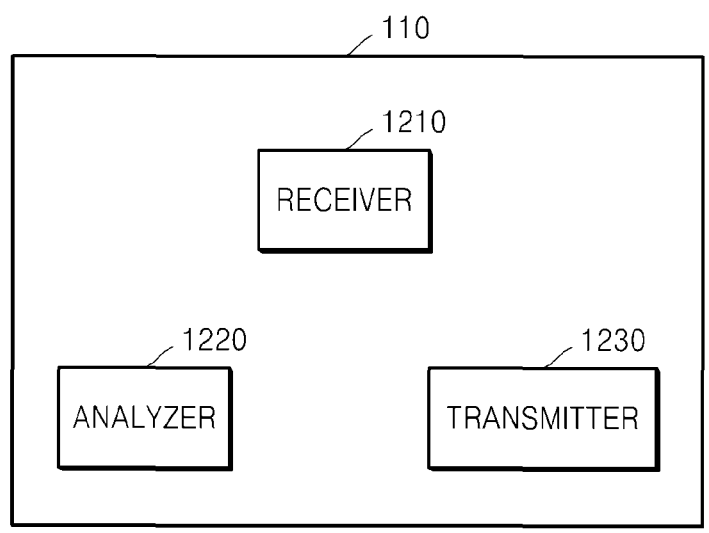
FIG. 12 illustrates a communicating device according to an exemplary embodiment.

FIG. 12 illustrates a communication device that might employ the method just described with respect to FIG. 11, according to an exemplary embodiment. Referring to FIG. 12, the communication device 110 includes a receiver 1210 receiving data via a lower layer protocol stack shared by a plurality of upper layer protocol stacks, an analyzer 1220 analyzing at least one of a destination network ID of the received data, a field value denoting a data type, and whether the upper layer protocol stack supports a broadcasting function or not, and a transmitter 1230 transmitting data to one of the plurality of upper layer protocol stacks according to an analysis result.

As described above, according to the inventive concept, a plurality of different types of protocol stacks may be efficiently implemented in one chip. Advantageously, the modification of conventional protocol stacks can be avoided. A device operating in accordance with the inventive concepts mentioned above may operate in a plurality of heterogeneous networks. A compatible ZigBee network server that allows ZigBee Pro devices to be controlled using ZigBee RF4CE devices and data of the ZigBee Pro devices to be used also in the ZigBee RF4CE devices may be provided. Moreover, a universal remote control (URC) for the ZigBee Pro and ZigBee RF4CE devices is provided. Also, the approach mentioned above may be used in implementing a proxy server between a ZigBee Pro network and a ZigBee RF4CE network.

As will be understood by one familiar with the field to which the exemplary embodiments pertain, the above-described exemplary structures may be concretely implemented in various ways, e.g., processor executable program commands, software modules, microcode, computer program products borne on a computer (or any data processing device)-readable recording medium, logic circuits, application specific integrated circuits (ASICs), or firmware. Also, apparatuses in accordance with the inventive concept may be configured using hardware, software, or a combination of hardware and software.

The inventive concept can also be embodied as computer-readable codes on a computer-readable recording medium. The computer-readable recording medium may be any data storage device that can store data which can be thereafter read by a computer system. Examples of the computer-readable recording medium include read-only memory (ROM), random-access memory (RAM), CD-ROMs, magnetic tape, floppy disks, and optical data storage devices. The computer-readable recording medium can also be distributed over network-coupled computer systems so that the computer-readable code is stored and executed in a distributed fashion. Also, it will be appreciated that one familiar with this field, having received the teachings of the examples shown above description and in the drawings, will readily be able to implement the same using functional programs, codes, and code segments in accordance with the particulars of any situation at hand.

As described above, the exemplary embodiments which have been described in detail with reference to the accompanying drawings, are provided to teach the inventive concept by way of example; these exemplary embodiments should not be interpreted as limiting the scope or spirit of the inventive concept. Similarly, the terminology used herein is for the purpose of describing particular exemplary embodiments only and is not intended to be limiting of exemplary embodiments. Accordingly, it should be understood, however, that there is no intent to limit the appended claims to the particular forms disclosed, but, on the contrary, the appended claims are meant to cover all modifications, equivalents, and alternatives falling within the scope of the inventive concept.

Furthermore, it will be understood by those familiar with this field that various changes in form and detail may be made without departing from the spirit and scope of the appended claims.

What is claimed is:

1. A communication method intended for use in a communication device that supports a plurality of communication methods, the method comprising:
    receiving data via a lower layer protocol stack that is shared by a plurality of upper layer protocol stacks;
    performing an analysis of one or more of:
        a destination network identifier (ID) of the received data,
        a field value denoting a data type of the received data, and
        whether one of the plurality of upper layer protocol stacks supports a broadcasting function;
    transmitting data to one of the plurality of upper layer protocol stacks according to a result of the analysis,
    wherein the transmitting comprises, when the destination network ID corresponds to a network ID of one of the plurality of upper layer protocol stacks, transmitting the data to a corresponding one of the upper layer protocol stacks, and when the destination network ID does not correspond to a network ID of any one of the plurality of upper layer protocol stacks and the destination network ID denotes broadcasting, transmitting the data to one of the plurality of upper layer protocol stacks according to whether each of the upper layer protocol stacks supports a broadcasting function.

2. The method of claim 1, wherein the transmitting comprises, when the destination network ID denotes broadcasting, and when the field value denoting the type of the data corresponds to broadcasting data of only one of the plurality of upper layer protocol stacks, transmitting the data to the only one of the plurality of upper layer protocol stacks.

3. The method of claim 1, wherein the transmitting comprises:
    when:
        the destination network ID denotes broadcasting, and
        the field value denoting the type of the data corresponds to broadcasting data of a first communication method, and
        an upper layer protocol stack of the first communication method supports a broadcasting function of the first communication method,
    then the transmitting of the data is to the upper layer protocol stack of the first communication method.

4. The method of claim 1, wherein the transmitting comprises:
    when:
        the destination network ID denotes broadcasting, and the field value denoting the type of the data corresponds to broadcasting data of a first communication method, and an upper layer protocol stack of the first communication method does not support a broadcasting function of the first communication method, then the transmitting of the data is to an upper layer protocol stack of a second communication method.

5. The method of claim 1, wherein the transmitting comprises:
when:
the destination network ID denotes broadcasting, and
an upper layer protocol stack of a first communication method does not support a broadcasting function of the first communication method,
then the transmitting of the data is to an upper layer protocol stack of a second communication method.

6. The method of claim 1, wherein the plurality of communication methods include a first communication method, which comprises ZigBee Pro standards, and a second communication method, which comprises Zigbee RF4CE standards.

7. The method of claim 1, wherein the broadcasting function comprises an Inter-PAN transmission function of a ZigBee Smart Energy (SE) profile.

8. The method of claim 1, wherein the field denoting the type of the data comprises a frame type field of a network header of the data.

9. A communication device supporting a plurality of communication methods, the device comprising:
a receiver configured to receive data via a lower layer protocol stack, wherein the lower protocol stack is shared by a plurality of upper layer protocol stacks;
an analyzer configured to perform an analysis of one or more of:
a destination network ID of the received data,
a field value denoting a data type of the received data, and
whether one of the plurality of upper layer protocol stacks supports a broadcasting function; and
a transmitter configured to transmit data to one of the plurality of upper layer protocol stacks according to a result of the analysis,
wherein when the destination network ID corresponds to a network ID of one of the plurality of upper layer protocol stacks, then the transmitter is configured to transmit the data to a corresponding one of the upper layer protocol stacks, and when the destination network ID does not correspond to a network ID of any one of the plurality of upper layer protocol stacks and the destination network ID denotes broadcasting, the transmitter is configured to transmit the data to one of the plurality of upper layer protocol stacks according to whether each of the upper layer protocol stacks supports a broadcasting function.

10. A non-transitory computer-readable storage medium having embodied thereon a computer program for executing the method of claim 1.

11. A communication device, comprising:
a plurality of upper layer communication protocols;
a shared lower layer communication protocol;
a non-transitory computer-readable medium of instructions enabling the communication device to carry out operations including:
analyzing a received data communication to obtain an analysis result based on one or more of:
a destination network identifier included in the received data, and
a data field, with a value denoting a data type, included in the received data; and
directing the content of the received data communication to a selected one or more of the plurality of upper layer protocol stacks in accordance with the analysis result;
wherein the directing of the content is carried out based also on whether one of the plurality of upper layer protocol stacks supports a data broadcast function,
wherein when the destination network identifier corresponds to a network identifier of one of the plurality of upper layer protocol stacks, the content of the received data communication is directed to a corresponding one of the upper layer protocol stacks, and when the destination network identifier does not correspond to a network identifier of any one of the plurality of upper layer protocol stacks and the destination network identifier denotes broadcasting, the content of the data communication is directed to one of the plurality of upper layer protocol stacks according to whether each of the upper layer protocol stacks supports a broadcasting function.

12. The communication device as set forth in claim 11, wherein:
the data field can take on a value denoting a broadcasting data type;
one of the plurality of upper layer protocol stacks supports a broadcasting function; and
when the analysis result is that the value of the data field denotes the broadcasting data type, the content of the data communication is directed to the one of the upper layer protocol stacks that supports the broadcasting function.

13. The communication device as set forth in claim 12, wherein:
the plurality of upper layer protocol stacks each have a respective, unique network identifier; and
when:
the data field in the received data denotes the broadcasting data type, and
the network identifier in the received data indicates an identifier corresponding to one of the plurality of upper layer protocol stacks that does not support the broadcasting function,
then the content of the data communication is directed to the one of the plurality of upper layer protocol stacks that does support the broadcasting function.

14. The communication device as set forth in claim 13, wherein the content of the data communication is directed to only the one of the plurality of upper layer protocol stacks that does support the broadcasting function.

15. The communication device as set forth in claim 13, wherein the content of the data communication is directed also to the one of the plurality of upper layer protocol stacks that has a respective network identifier corresponding to the network identifier in the received data.

* * * * *